US006093578A

United States Patent [19]
Klappert et al.

[11] Patent Number: 6,093,578
[45] Date of Patent: Jul. 25, 2000

[54] METHOD FOR MANUFACTURING A PLURALITY OF ELECTRO-OPTICAL CELLS, IN PARTICULAR LIQUID CRYSTAL CELLS

[75] Inventors: Rolf Klappert; Jean-Michel Künzi, both of Neuchâtel, Switzerland

[73] Assignee: Asulab S.A., Bienne, Switzerland

[21] Appl. No.: 09/217,063

[22] Filed: Dec. 21, 1998

[30] Foreign Application Priority Data

Dec. 22, 1997 [EP] European Pat. Off. .............. 97122611

[51] Int. Cl.[7] .................................................. H01L 21/00
[52] U.S. Cl. ............................ 438/30; 438/158; 438/166
[58] Field of Search .............................. 438/30, 158, 166

[56] References Cited

U.S. PATENT DOCUMENTS

| 5,438,556 | 8/1995 | Dinger et al. | 429/111 |
| 5,441,827 | 8/1995 | Gratzel et al. | 429/111 |
| 5,464,490 | 11/1995 | Sato et al. | 156/145 |

FOREIGN PATENT DOCUMENTS 0 127 374  12/1984  European Pat. Off. .
WO 96/18930  6/1996  WIPO .

OTHER PUBLICATIONS

Patent Abstracts of Japan, JP 58 106523, Jun. 24, 1983, vol. 007, No. 212.
Patent Abstracts of Japan, JP 58 095713, Jun. 7, 1983, vol. 007, No. 196.
Patent Abstracts of Japan, JP 58 181022, Oct. 22, 1983, vol. 8, No. 23.

*Primary Examiner*—Amir Zarabian
*Assistant Examiner*—Michael S. Lebentritt
*Attorney, Agent, or Firm*—Sughrue, Mion, Zinn, Macpeak & Seas, PLLC

[57] ABSTRACT

The invention concerns a collective manufacturing method for a plurality of individual electro-optical cells each formed of two outer substrates and one intermediate substrate inserted between the outer substrates. The substrates are connected to each other by a sealing frame to form two cavities receiving liquid crystals. This method includes a step consisting in making a zone of least mechanical resistance along the contour of each individual double cell in the intermediate plate in order to facilitate the division of the batch into individual cells during the step of dividing the batch by scribing and breaking the outer substrates.

21 Claims, 3 Drawing Sheets

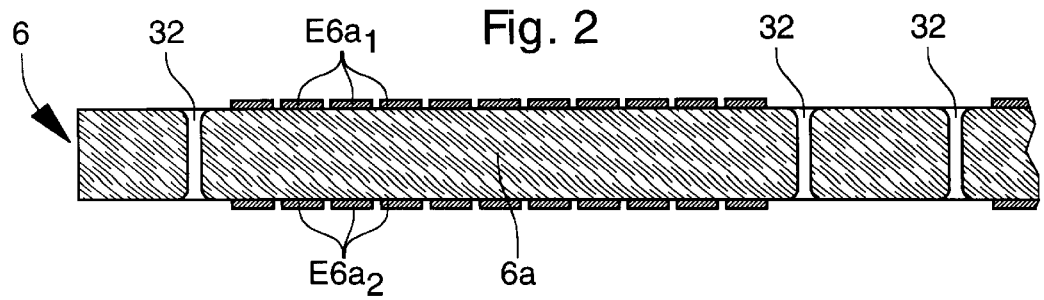
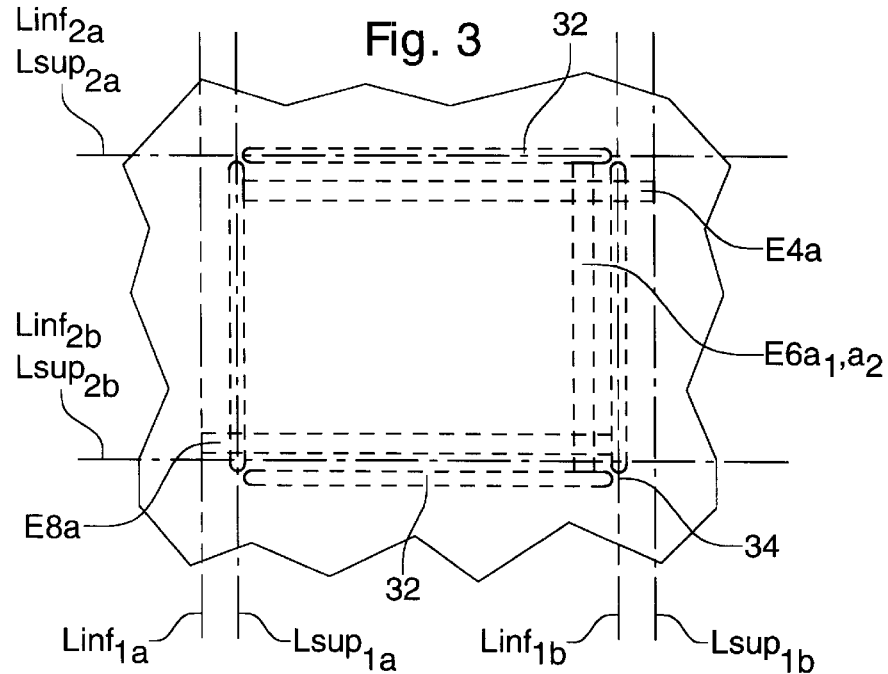
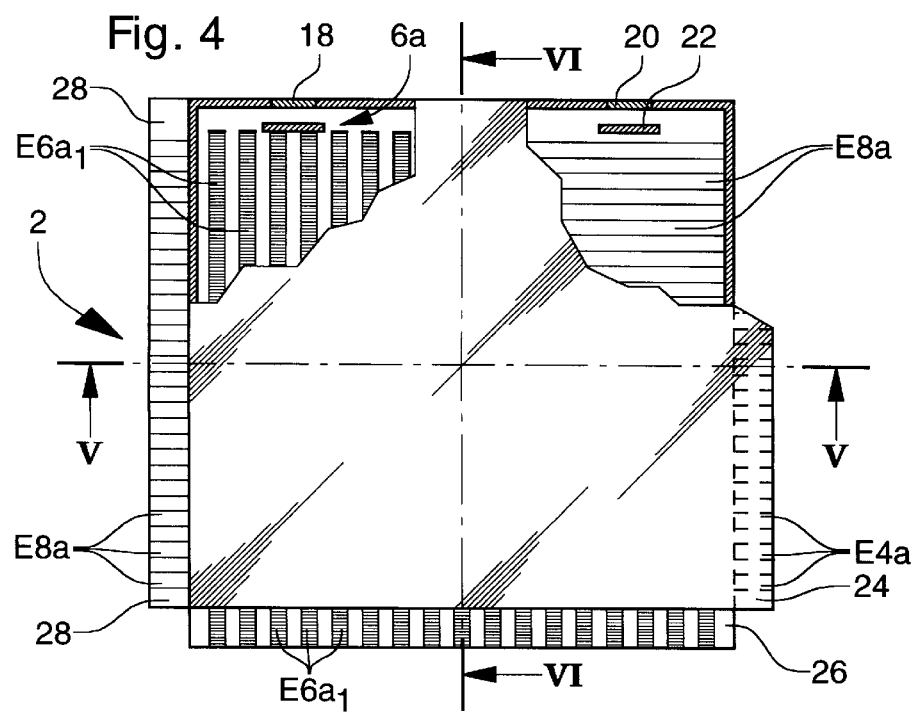

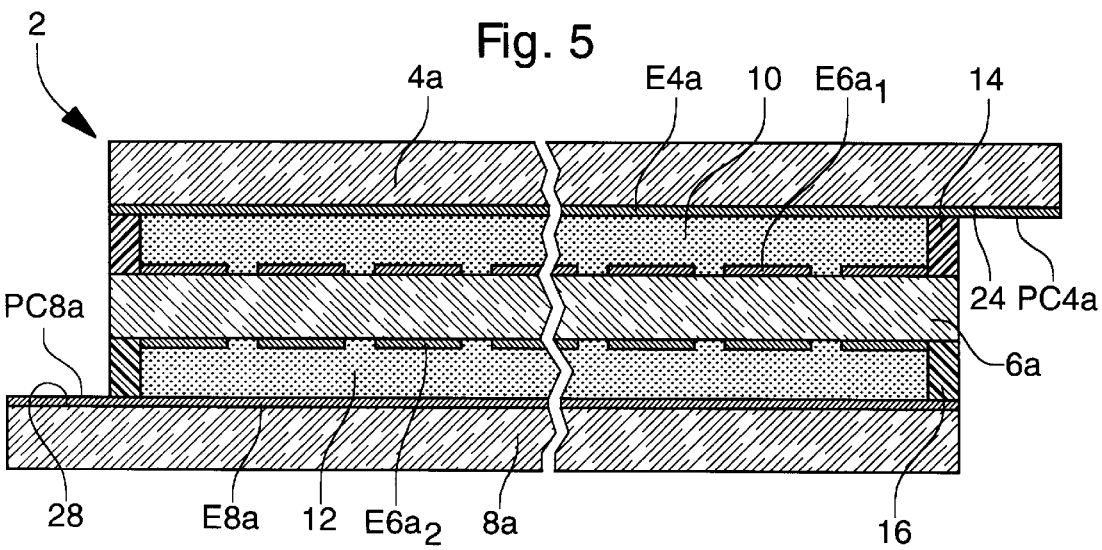
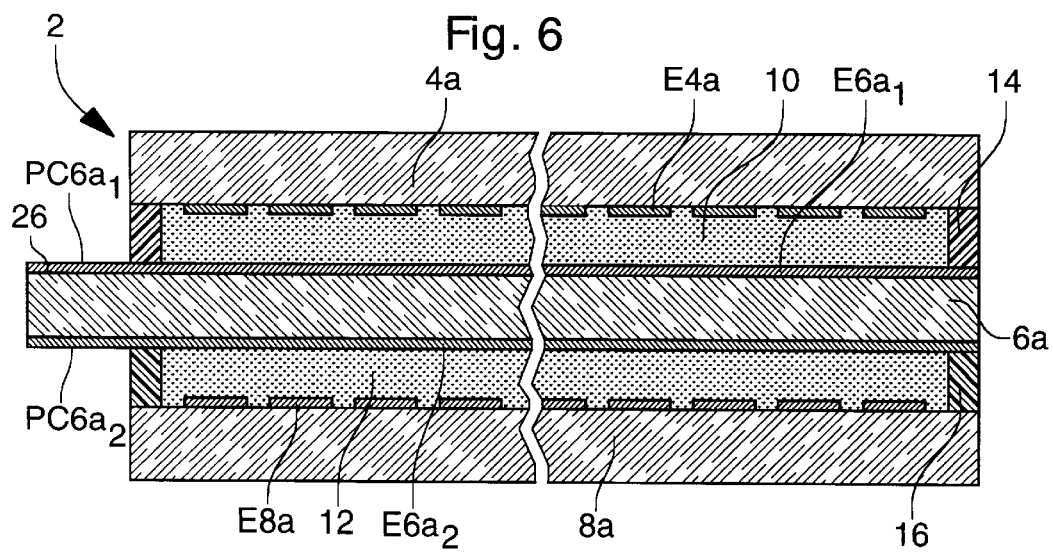

METHOD FOR MANUFACTURING A PLURALITY OF ELECTRO-OPTICAL CELLS, IN PARTICULAR LIQUID CRYSTAL CELLS

BACKGROUND OF THE INVENTION

The present invention concerns a method for manufacturing a plurality of electro-optical or photovoltaic cells having at least three substrates and two cavities filled with a liquid for example liquid crystals. More particularly, the invention concerns a collective manufacturing method for a batch of such cells wherein the step of dividing the batch into individual cells is facilitated.

Double liquid crystal cells are well known in the state of the art and are intended for example to form colour image display devices. Such a double cell, which is for example disclosed in the Patent Application No. WO 89/00300, includes three parallel substrates, two outer substrates and an intermediate substrate connected in pairs by means of two sealing frames. The faces of the intermediate substrate and respectively the outer substrates which are located facing each other carry a set of electrodes and the two cavities defined respectively between the intermediate substrate and the two outer substrates are filled with liquid crystals.

The manufacture of this type of cell is currently performed in accordance with two methods.

According to the first method, two batches of conventional cells are manufactured, i.e. with two substrates and one cavity, the cells of each batch including the desired liquid crystals. The two batches are divided into individual cells and the individual cells of one batch are assembled by bonding using a suitable adhesive material to the individual cells of the other batch.

In order to make each of these batches, two large plates of glass or synthetic material are prepared, a pattern of sets of electrodes and conductive paths are made on the opposite faces of these plates, sealing material is deposited on one of said plates and a filling opening for each cell of the batch is arranged therein, the sealing material extending around each set of electrodes. The two base plates are then assembled to form an assembly including several rows of open cells. This assembly is then divided into rectilinear strips by glass scribing and breaking techniques (see for example U.S. U.S. Pat. No. 4,224,093) or by sawing along parallel straight lines. Since each cell has a filling opening along one edge of the strip, the cells are then filled, and their openings are sealed, then the strip is divided into individual rectangular cells along straight lines which are perpendicular to the preceding straight lines.

A first drawback of this method lies in the fact that the double cell which results therefrom has four substrates and consequently a significant thickness. Another drawback is the increase in the parallax effect between the two layers of liquid crystals because of the double thickness of the intermediate substrate which is formed in this case by two bonded plates. This is thus evidently detrimental to the quality of the displayed image. Moreover, this method involves a large number of manipulations, which makes it laborious and more expensive.

According to the second method, cells with three substrates are manufactured one by one because of the impossibility of cutting the three substrates simultaneously by conventional scribing and sawing techniques. Each manufacturing step has thus to be performed individually on each cell, which makes the manufacture of such cells tedious and naturally more expensive than if it could be performed in batches.

BRIEF SUMMARY OF THE INVENTION

An object of the present invention is to overcome the drawbacks of the aforementioned prior art by providing a collective manufacturing method wherein a plurality of cells, including at least three substrates, is made in a single batch, such batch being then able to be easily divided into individual cells in an inexpensive manner without any risk of damaging the individual cells.

The invention thus concerns a collective manufacturing method for a plurality of multiple individual electro-optical or photovoltaic cells, each cell including:
  at least two cavities filled with a liquid and each delimited by a sealing frame arranged between an outer substrate and an intermediate substrate;
  electrodes arranged on the surface of each substrate turned towards the other substrate;
the method being characterised in that it includes at least the following steps:
  (a) providing at least one intermediate plate common to all the cells and in which the intermediate substrate of each cell will be formed, and first and second outer plates which are also common to all the cells and in which the two outer substrates will respectively be formed, the intermediate plate and at least the first or the second outer plate being transparent;
  (b) forming on those faces of the first and second outer plates and the intermediate plate which are intended to face each other a pattern of sets of electrodes, each set of electrodes being associated with an individual cell;
  (c) depositing on at least one of said faces intended to face each other a sealing material to form a plurality of sealing frames, each of them being associated with an individual cell;
  (d) forming a zone of least mechanical resistance along the contour of each individual cell in the intermediate plate;
  (e) combining the intermediate plate with each of the first and second outer plates so that said electrode patterns carried by the first and second outer plates cooperate with the electrode patterns carried by the intermediate plate;
  (f) bonding the first and second plates to the intermediate plate by means of the sealing material;
  (g) forming scribe lines delimiting the contour of each individual cell on the outer surface of the first and second outer cells;
  (h) dividing the batch into individual cells by breaking the first and second outer plates and the intermediate plate along the contour of each cell;
  (i) filling the cavities of each individual cell with a liquid, the cavities being defined by the first and second plates, the intermediate plate and the sealing frames.

As a result of these features, the collective manufacture of a batch of cells including one or more plates intended to form intermediate substrates which are inaccessible from the exterior is made possible, the step of separating the individual cells from the batch being moreover performed in a conventional manner by the techniques of scribing and breaking the outer plates. The application of force on the outer plates in order to break them along the scribe lines also causes breaking the intermediate plate or plates in the zone of least resistance of the latter and consequently the separation of the batch into individual cells. If necessary, the edges of the intermediate substrates of the cells could be trimmed.

According to an advantageous embodiment, the zone of least mechanical resistance is formed by cutting a long continuous or discontinuous slit along the contour of each individual cell so that a central portion forming the intermediate substrate is connected to the rest of the intermediate plate by at least a bridge of material and preferably four bridges of material.

The presence of these bridges allows a compromise to be achieved between the mechanical resistance necessary for the intermediate plate or plates to be able to undergo the different treatments and manipulations steps prior to assembly and the fragility necessary for easy separation of the individual cells from the batch at the dividing step.

Other features and advantages of the present invention will appear in the following description of a preferred embodiment, given by way of non-limiting example with reference to the annexed drawings, in which:

BRIEF DESCRIPTION OF THE DRAWINGS

FIG. 2 is a schematic cross-section of the intermediate plate along the line II—II of FIG. 1, FIG. 3 is a partial top view of a batch after scribe line formation step (g), FIG. 4 is a schematic plane view of a double cell detached from the batch of FIG. 1 and partially cut away in the two upper corners thereof, and FIGS. 5 and 6 are schematic cross-sections of a double cell detached from the batch of FIG. 1 along the lines V—V and VI—VI of FIG. 4 respectively.

DETAILED DESCRIPTION OF THE INVENTION

Figure 1:
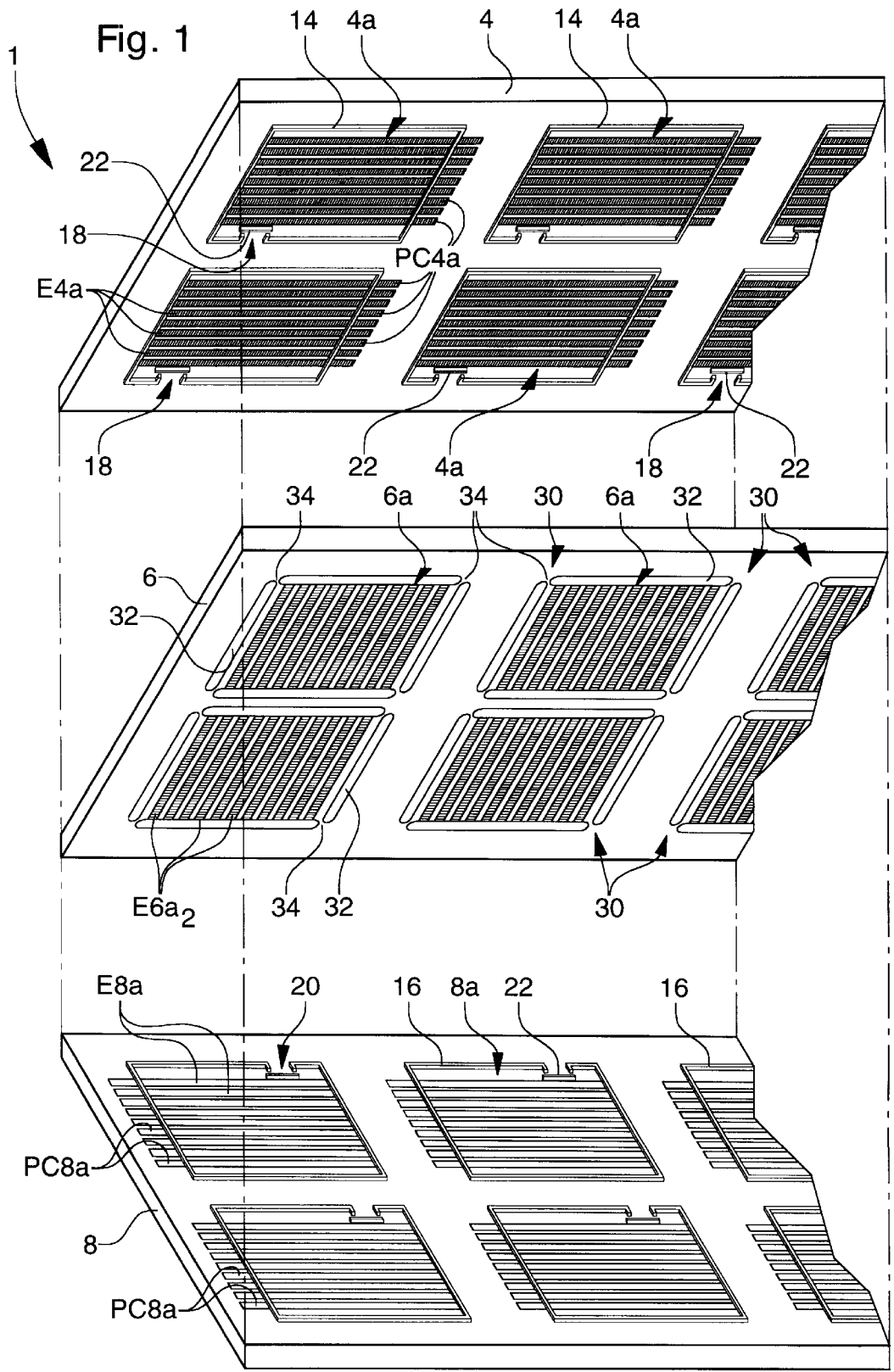
FIG. 1 is a blown up partial schematic view of a batch of double liquid crystal display (LCD) cells during manufacturing according to the present invention.

With reference in particular to FIG. 1, a set 1 of double LCD cells 2 is seen (FIG. 4) during manufacturing, all of such cells being defined by three superposed plates, namely two outer plates 4 and 8 and an intermediate plate 6. Outer plates 4 and 8 are common to all of cells 2 and are intended to form respectively the upper and lower substrates 4a and 8a of each individual cell. Plate 6 is also common to all of cells 2 and is intended to form the intermediate substrate 6a of each individual cell 2.

Plate 6 and at least plate 4 are transparent. In the example illustrated, the three plates 4, 6 and 8 are transparent and are formed for example by glass plates. Of course, other materials such as synthetic materials could be envisaged.

Referring also to FIGS. 5 and 6 it can be seen that each double cell 2 includes superposed two cavities 10 and 12 each intended to contain an active material such as a type of liquid crystal. These two cavities are defined by substrates 4a and 6a and 6a and 8a respectively and the respective sealing frames 14, 16 which bond plates 4 and 8 onto plate 6.

In a variant cavities 1 and 12 may be divided into several compartments intended to contain a different type of active material such as liquid crystal as disclosed in said WO 89/00300.

Sealing frames 14 and 16 follow the external contour of the active surface of each cell 2 and in the assembly shown in FIG. 1, sealing frames 14 and 16 have a rectangular configuration. These frames are formed in a conventional manner by the sealing material. It is also seen that filling openings 18, 20 are arranged respectively in sealing frames 14, 16 of each cell 2 facing a small wall 22 used to block the plug of adhesive material used to seal openings 18 and 20 after filing the cells.

As will be described more precisely hereinafter, in order to facilitate the filling of cells 2, openings 18, 20 are arranged along the same edge of each cell 2 and in opposite corners.

The facing surfaces of substrates 4a and 6a each include a set of parallel transparent electrodes E4a and E6$a_1$, these sets being oriented perpendicular to each other. Likewise, the facing surfaces of substrates 8a and 6a each include a set of parallel transparent electrodes E8a and E6$a_2$, these sets being oriented perpendicular to each other. For the sake of clarity, sets E6$a_1$, which are applied to the face of plate 6 located facing plate 4, have been omitted from FIG. 1. This perpendicular arrangement of the electrodes allows the definition between substrate 6a and 8a, of two pixel matrices whose pixels are located at the crossing point of the respective electrodes of each of such matrices. By applying a control voltage across crossed electrodes of the same matrix, it is possible to modify the optical conditions of the liquid crystals situated a the crossing point concerned, as is well known to those skilled in the art. Each electrode is formed of a conductive strip deposited by conventional photolithographic techniques and is preferably made of indium tin oxide (ITO).

In FIGS. 4, 5 and 6, it is also understood that each cell 2 includes three rectilinear edges 24, 26 and 28 where substrates 4a, 6a and 8a respectively project laterally with respect to the two others to show, close to the edge, a series of contact pads PC4a, PC6$a_1$, PC6$a_2$ and PC8a formed by extensions of electrodes E4a, E6$a_1$, E6$a_2$ and E8a beyond sealing frames 14 and 16. These contact pads are used as external connections for such electrodes. The rest of the external contour of cell 2, a single edge in the example shown, is at the same location for the three glass plates 4, 6 and 8.

It will be noted that in FIG. 4 substrate 4a has been partially cut away in the left corner to show electrodes E6$a_1$. Substrates 4a and 6a have been partially cut away in the upper right corner to show electrodes E8a.

The manufacture of LCD cells 2 is preferably performed in the following manner. Plates 4 and 8 are each covered in a conventional manner, on one of the faces thereof, with their sets of electrodes E4a and E8a respectively, each of these sets being associated with an individual cell. Plate 6 is covered on the two faces thereof with sets of electrodes E6$a_1$ and E6$a_2$. Sets of electrodes E4a of plate 4 are intended to face sets of electrodes E6$a_1$ of plate 6, whereas sets of electrodes E8a of plate 8 are intended to face sets of electrodes E6$a_2$ of plate 6. If necessary, alignment layers or other elements such as filters or dielectric layers (not shown) could also be deposited above these sets of electrodes. The electrode and layer deposition techniques are well known to those skilled in the art and will consequently not be described.

It will also be understood that the contact pads mentioned hereinbefore are made at the same time as the electrodes.

The material intended to form sealing frames 14 and 16 and walls 22 is applied onto the faces of plates 4 and 8 carrying the electrodes. It is clear that this material could be applied solely onto the faces of plate 6 carrying the sets of electrodes or even that this material could be partially applied onto each of the facing faces of plates 4, 6 and 8.

In the example shown, it will be noted that sealing frames 14 and 16 do not completely circumscribe patterns E4a, E6$a_1$, E8a and E6$a_2$ with which they are associated, and in particular that they are arranged so that a portion PC4a, PC6$a_1$, PC8a and PC6$a_2$ of electrodes E4a, E6$a_1$, E8a and E6$a_2$ extend laterally beyond sealing frames 14 and 16 and form the contact pads described hereinbefore.

According to a step of the manufacturing method of the invention, one or more zones 30 of least mechanical resistance are arranged along the contour of each individual cell in plate 6 in which the intermediate substrates of the finished individual cells will be formed. Zones 30 are formed according to one embodiment by cutting one or more continuous slits 32 along the contour of each cell, so that the central portion forming substrate 6a is connected to the rest of plate 6 by at least one bridge of material 34, and preferably four bridges 34 as is shown in FIGS. 1 and 3. The width and the length of the bridges connecting substrates 6a to the rest of plate 6 will depend essentially on the thickness of plate 6. By way of example, for a plate 6 having a thickness of approximately 0.3 to 1 mm, the total length of the bridges, i.e. the distance between the ends of consecutive slits is comprised between 0.3 mm and 2 mm and their width is W mm.

These slits are preferably cut in a single working step by means of a very high pressure water jet cutting machine, preferably automatically controlled. The water jet and the nozzle which produces it are preferably stationary, whereas the machine moves plate 6 in a plane so that the jet follows the trajectory to be cut on the batch. However, techniques using a moving jet may also be used. It goes without saying that other means can be used to make these slits, one could for example use sand jet or laser cutting machines (Co2 or excimer).

In the event that the slits are made after the deposition of the sets of electrodes on plate 6, if necessary, the two surfaces of this plate will be protected for example by a layer of photoresist deposited and removed in a conventional manner.

According to an alternative embodiment which is not shown, the zone of least resistance is formed by cutting, along the contour of each cell, a plurality of slits slightly spaced apart from each other like the dots of a dotted line. It is of course clear that any type of shape providing a zone of low mechanical resistance long the contour of the cell can be envisaged. One could for example also etch grooves on one or both of the faces of plate 6 following the contour of the cell so that substrates 6a are held to the rest of plate 6 by a wall of very small thickness, such thickness being just sufficient to undergo the stress imposed on the plate during the preliminary treatment steps without breaking.

Once zones 30 of least mechanical resistance are made, plate 6 is combined with each of plates 4 and 8 so that the sets of electrodes carried by plates 4 and 8 align or co-operate with the sets of electrodes which are associated therewith, carried by plate 6. Plates 4 and 8 are then bonded to plate 6 by means of the sealing material forming frames 14 and 16.

According to one embodiment, assembly 1 is then divided into individual cells 2. In order to do this, parallel scribe lines are made delimiting the contour of each individual cell on the outer surface of plates 4 and 8. More particularly, a first series of parallel scribe lines is formed along lines respectively designated Lsup1a and Lsup1b and a second series of parallel scribe lines is formed along lines Lsup2a and Lsup2b perpendicular to lines Lsup1a. A third series of parallel scribe lines is also formed on plate 8 along lines Linf1a and Linf1b and a second series of parallel scribe lines along lines Linf2a and Linf2b perpendicular to lines Linf1a.

In the example illustrated, these lines are parallel in pairs to the side of sealing frames 14 and 16 and naturally extend outside the limits of the sealing frames with which they are associated. All of these lines are represented by dot and dash lines in FIG. 3.

Lines Lsup1a extend substantially above slits 32 of plate 6, whereas lines Lsup1b are substantially offset laterally towards the exterior of the cells (towards the right in FIG. 3) with respect to slits 32 in order to arrange rectilinear edge 24 where plate 4 projects laterally with respect to the two other plates 6 and 8.

Lines Lsup2a and Linf2a extend respectively substantially above slits 32 in plates 6 and 8, whereas lines Lsup2b and Linf2b are respectively substantially offset laterally towards the interior of the cells with respect to slits 32 in order to release rectilinear edge 26 where plate 6 projects laterally with respect to the two other plates 4 an d8.

Lines Linf1a are substantially offset laterally with respect to slits 32 towards the exterior of the cells in order to arrange rectilinear edge 28 where plate 8 projects laterally with respect to the two other plates 4 and 6, whereas lines Linf1b extend substantially above slits 32 in plate 8.

Tracing of these scribe lines on plates 4 and 8 is performed in a conventional manner, for example by means of a diamond tool or a laser beam.

After this step of forming the scribe lines, the batch can easily be divided into individual cells by breaking plates 4 and 8 along lines Lsup1a, Lsup1b, Lsup2a and Lsup2b and respectively along lines Linf1a, Linf1b, Linf2a and Linf2b. Simultaneously, zones of least resistance 30 of plate 6 break, which releases cells 2 from the rest of plate 6.

The contour of each individual cell 2 is trimmed preferably at least in the intermediate substrate zone of breakage 30.

Next, each cell 2 is treated separately in order to fill, in a conventional manner, the two cavities thereof with liquid crystal, and then to seal filling openings 18, 20.

According to an advantageous feature of the invention, the two filling openings 18, 20 are made on the same edge of each cell 2 and are spaced laterally, so that it is possible to fill the two cavities 10, 12 simultaneously with liquid crystals of different types. In order to do this, a vacuum is created in each of the two cavities 10, 12 then the edge of cell 2 including filling openings 18, 20 is placed in containers filled with liquid crystals. Cavities 10, 12 are then filled by capillarity from the containers.

According to an alternative embodiment of the invention which is not shown, the step of dividing cells 2 from batch 1 can include an intermediate step during which batch 1 is divided into several sub-assemblies in the shape of rectilinear strips. Each sub-assembly can include one or more rows of cells 2 so that each cell 2 includes at least one rectilinear edge formed by an edge of the strip. By arranging filling openings 18, 20 of the cells of the second row on the side opposite to that of the first row, it is possible to achieve simultaneous filling of a plurality of cells 2 of each row before definitively separating the cells.

The case in which cells 2 include more than one intermediate substrate is included within the scope of the present invention. In this case, each plate in which the intermediate substrates are made is prepared in conformity with plate 6 as described hereinbefore.

The case in which a set of photovoltaic cells, for example of the electrochemical type with at least three substrates is also included within the scope of the present invention. Cells of this type with two substrates are disclosed for example in Patent Publication Nos. WO 91/16719 and WO 95/18456. Consequently, it is possible to manufacture cells filled by known means entirely in batches, then to divide the batch as has just been described hereinbefore.

One could also envisage manufacturing a batch of multiple cells such as defined hereinbefore, each individual cell including a first cavity filled with liquid crystals and a second cavity including a physio-chemical system capable of absorbing light and generating an electric voltage across the terminals of the electrode with which it is associated. Such as system is disclosed for example in Patent Publication Nos. WO 91/16719 and WO 95/18456.

What is claimed is:

1. A collective manufacturing method for a plurality of multiple individual electro-optical or photovoltaic cells, each cell including:
    at least two cavities filled with a liquid and each delimited by a sealing frame arranged between an outer substrate and an intermediate substrate;
    electrodes arranged on the surface of each substrate turned towards the other substrate;
    wherein the method includes at least the following steps:
        (a) providing at least one intermediate plate common to all the cells and in which the intermediate substrate of each cell will be formed, and first and second outer plates which are also common to all the cells and in which the two outer substrates will respectively be formed, the intermediate plate and at least the first or the second outer plate being transparent;
        (b) forming on faces of the first and second outer plates and the intermediate plate which are intended to face each other a pattern of sets of electrodes, each set of electrodes being associated with an individual cell;
        (c) depositing on at least one of said faces intended to face each other a sealing material to form a plurality of sealing frames, each sealing frame being associated with an individual cell;
        (d) forming a zone of least mechanical resistance along a contour of each individual cell in the intermediate plate;
        (e) combining the intermediate plate with each of the first and second outer plates so that said electrode patterns carried by the first and second outer plates cooperate with the electrode patterns carried by the intermediate plate;
        (f) bonding the first and second plates to the intermediate plate by means of the sealing material;
        (g) forming scribe lines delimiting the contour of each individual cell on the outer surface of the first and second outer cells;
        (h) dividing the batch into individual cells by breaking the first and second outer plates and the intermediate plate along the contour of each cell;
        (i) filling the cavities of each individual cell with a liquid, the cavities being defined by the first and second plates, the intermediate plate and the sealing frames.

2. A method according to claim 1, wherein said zone of least mechanical resistance is formed by cutting a continuous or discontinuous slit along the contour of each double cell so that a central portion forming the intermediate substrate is connected to the rest of the intermediate plate by at least one bridge of material.

3. A method according to claim 2, wherein the central cut portion forming the intermediate substrate is connected to the rest of the intermediate substrate by four bridges of material.

4. A method according to claim 1, wherein said zone of least mechanical resistance is formed by cutting a plurality of slits slightly spaced apart from each other along the contour of each cell.

5. A method according to claim 4, wherein the step (h) of dividing cells from the batch includes an intermediate step consisting of dividing said batch into several strips each including one or more rows of cells so that each cell includes at least one rectilinear edge formed by an edge of the strip.

6. A method according to claim 5, wherein the division into strips is performed prior to the cell filling step.

7. A method to claim 1, wherein during step (c), a filling opening is arranged for each cavity of each individual cell.

8. A method according to claim 7, wherein each cell has a rectilinear edge and in that the filling openings of a same cell are made on said edge and are spaced laterally apart from each other.

9. A method according to claim 1, wherein said first and second plates and the intermediate plate are made of glass.

10. A method according to claim 1, further including a step of trimming the contour of each individual cell at least in the zone of least mechanical resistance of the intermediate substrate.

11. A method according to claim 1, wherein a first cavity is filled with liquid crystals and wherein a second cavity includes a physio-chemical system capable of absorbing light and generating an electric voltage across the terminals of the electrodes with which it is associated.

12. A collective manufacturing method for a plurality of multiple individual electro-optical or photovoltaic cells, each cell including:
    at least two superposed cavities filled with an active material and each delimited by sealing means arranged between an outer substrate and two intermediate substrates;
    electrodes arranged on the surface of each substrate turned towards another substrate;
    wherein the method includes at least the following steps:
        (a) providing at least one intermediate plate common to all the cells and in which the intermediate substrates of each cell will be formed, and first and second outer plates which are also common to all the cells and in which the two outer substrates will respectively be formed, the intermediate plates and at least the first or the second outer plate being transparent;
        (b) forming on faces of the first and second outer plates and the intermediate plates, which are intended to face each other, a pattern of sets of electrodes, each set of electrodes being associated with an individual cell;
        (c) depositing on at least one of said faces, intended to face each other, sealing means to form a plurality of sealing frames, each sealing frame being associated with an individual cell;
        (d) forming a zone of least mechanical resistance along a contour of each individual cell in the intermediate plates;
        (e) forming a stack comprising the outer plates and the intermediate plates so that said electrode patterns carried by each intermediate plate or each of the outer plates cooperate with the electrode patterns of its associated plates;
        (f) bonding the plates to each other by means of the sealing means;
        (g) forming scribe lines delimiting the contour of each individual cell on the outer surface of the first and second outer cells;

(h) dividing the batch into individual cells by breaking the first and second outer plates and the intermediate plate along the contour of each cell;
(i) filling the superposed cavities of each individual cell with the active material, the superposed cavities being defined by the first and second plates, the intermediate plates and the sealing means.

13. A method according to claim 12, wherein said zone of least mechanical resistance is formed by cutting a continuous or discontinuous slit along the contour of each multiple substrate cell so that a central portion forming the intermediate substrates of such cells is connected to the rest of the intermediate plates by at least one bridge of material.

14. A method according to claim 12, wherein said first and second plates and the intermediate plates are made of glass.

15. A collective manufacturing method for a plurality of multiple individual electro-optical or photovoltaic cells, each cell including:
at least two superposed cavities filled with an active material and arranged between an outer substrate and intermediate substrate or the two intermediate substrates;
electrodes arranged on the surface of each substrate turned towards another substrate;
wherein the method includes at least the following steps:
 (a) providing at least one intermediate plate common to all the cells and in which the intermediate substrates of each cell will be formed, and first and second outer plates which are also common to all the cells and in which the two outer substrates will respectively be formed, the intermediate plates and at least the first or the second outer plate being transparent;
 (b) forming on faces of the first and second outer plates and the intermediate plates, which are intended to face each other, a pattern of sets of electrodes, each set of electrodes being associated with an individual cell;
 (c) depositing on at least one of said faces intended to face each other said active material;
 (d) forming a zone of least mechanical resistance along a contour of each individual cell in the intermediate plates;
 (e) forming a stack comprising the outer plates and the intermediate plates so that said electrode patterns carried by each intermediate plate or each of the outer plates co-operate with the electrode patterns of its associated plates;
 (f) bonding the plates to each other by means of sealing means;
 (g) forming scribe lines delimiting the contour of each individual cell on the outer surface of the first and second outer cells; and
 (h) dividing the batch into individual cells by breaking the first and second outer plates and the intermediate plate along the contour of each cell.

16. A method according to claim 15, wherein said zone of least mechanical resistance is formed by cutting a continuous or discontinuous slit along the contour of each multiple substrate cell so that a central portion forming the intermediate substrates of such cells is connected to the rest of the intermediate plates by at least one bridge of material.

17. A method according to claim 16, wherein the central cut portion forming the intermediate substrates is connected to the rest of the intermediate substrates by four bridges of material.

18. A method according to claim 15, wherein said first and second plates and the intermediate plates are made of glass.

19. A collective manufacturing method for a plurality of multiple individual electro-optical or photovoltaic cells, each cell including:
at least two cavities filled with a liquid and each delimited by a sealing frame arranged between an outer substrate and an intermediate substrate;
electrodes arranged on the surface of each substrate turned towards the other substrate;
wherein the method includes at least the following steps:
 (a) providing at least one intermediate plate common to all the cells and in which the intermediate substrate of each cell will be formed, and first and second outer plates which are also common to all the cells and in which the two outer substrates will respectively be formed, the intermediate plate and at least the first or the second outer plate being transparent;
 (b) forming on faces of the first and second outer plates and the intermediate plate which are intended to face either other a pattern of sets of electrodes, each set of electrodes being associated with an individual cell;
 (c) depositing on at least one of said faces intended to face each other a sealing material to form a plurality of sealing frames, each sealing frame being associated with an individual cell;
 (d) forming a zone of least mechanical resistance along a contour of each individual cell in the intermediate plate;
 (e) combining the intermediate plate with each of the first and second outer plates so that said electrode patterns carried by the first and second outer plates cooperate with the electrode patterns carried by the intermediate plate;
 (f) bonding the first and second plates to the intermediate plate by means of the sealing material;
 (g) dividing the batch into individual cells by breaking the first and second outer plates and the intermediate plate along the contour of each cell; and
 (h) filling the cavities of each individual cell with a liquid, the cavities being defined by the first and second plates, the intermediate plate and the sealing frames.

20. A collective manufacturing method for a plurality of multiple individual electro-optical or photovoltaic cells, each cell including:
at least two superposed cavities filled with an active material and each delimited by sealing means arranged between an outer substrate and two intermediate substrates;
electrodes arranged on the surface of each substrate turned towards another substrate;
wherein the method includes at least the following steps:
 (a) providing at least one intermediate plate common to all the cells and in which the intermediate substrates of each cell will be formed, and first and second outer plates which are also common to all the cells and in which the two outer substrates will respectively be formed, the intermediate plates and at least the first or the second outer plate being transparent;
 (b) forming on faces of the first and second outer plates and the intermediate plates, which are intended to face each other, a pattern of sets of electrodes, each set of electrodes being associated with an individual cell;
 (c) depositing on at least one of said faces, intended to face each other, sealing means to form a plurality of sealing frames, each sealing frame being associated with an individual cell;

(d) forming a zone of least mechanical resistance along a contour of each individual cell in the intermediate plates;
(e) forming a stack comprising the outer plates and the intermediate plates so that said electrode patterns carried by each intermediate plate or each of the outer plates cooperate with the electrode patterns of its associated plates;
(f) bonding the plates to each other by means of the sealing means;
(g) dividing the batch into individual cells by breaking the first and second outer plates and the intermediate plate along the contour of each cell; and
(h) filling the superposed cavities of each individual cell with the active material, the superposed cavities being defined by the first and second plates, the intermediate plates and the sealing means.

21. A collective manufacturing method for a plurality of multiple individual electro-optical or photovoltaic cells, each cell including:
   at least two superposed cavities filled with an active material and arranged between an outer substrate and intermediate substrate or the two intermediate substrates;
   electrodes arranged on the surface of each substrate turned towards another substrate;
   wherein the method includes at least the following steps:
      (a) providing at least one intermediate plate common to all the cells and in which the intermediate substrates of each cell will be formed, and first and second outer plates which are also common to all the cells and in which the two outer substrates will respectively be formed, the intermediate plates and at least the first or the second outer plate being transparent;
      (b) forming on faces of the first and second outer plates and the intermediate plates, which are intended to face each other, a pattern of sets of electrodes, each set of electrodes being associated with an individual cell;
      (c) depositing on at least one of said faces intended to face each other said active material;
      (d) forming a zone of least mechanical resistance along a contour of each individual cell in the intermediate plates;
      (e) forming a stack comprising the outer plates and the intermediate plates so that said electrode patterns carried by each intermediate plate or each of the outer plates co-operate with the electrode patterns of its associated plates;
      (f) bonding the plates to each other by means of sealing means; and
      (h) dividing the batch into individual cells by breaking the first and second outer plates and the intermediate plate along the contour of each cell.

* * * * *